United States Patent
Hwang et al.

(10) Patent No.: US 10,402,086 B2
(45) Date of Patent: Sep. 3, 2019

(54) MOBILE TERMINAL AND METHOD FOR CONTROLLING THE SAME

(71) Applicant: LG ELECTRONICS INC., Seoul (KR)

(72) Inventors: Jiwoon Hwang, Seoul (KR); Sungil Kang, Seoul (KR); Chaesung Leem, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 15/520,804

(22) PCT Filed: Nov. 14, 2014

(86) PCT No.: PCT/KR2014/010964
§ 371 (c)(1),
(2) Date: Apr. 20, 2017

(87) PCT Pub. No.: WO2016/076464
PCT Pub. Date: May 19, 2016

(65) Prior Publication Data
US 2017/0329508 A1    Nov. 16, 2017

(51) Int. Cl.
*G06F 3/0488*    (2013.01)
*G02B 27/64*    (2006.01)
(Continued)

(52) U.S. Cl.
CPC ....... *G06F 3/04883* (2013.01); *G02B 27/646* (2013.01); *G06F 3/038* (2013.01);
(Continued)

(58) Field of Classification Search
CPC . G06F 3/04883; G11B 27/036; H04N 21/854; H04N 5/772; H04N 21/858
See application file for complete search history.

(56) References Cited

U.S. PATENT DOCUMENTS

2002/0171669 A1    11/2002    Meron et al.
2009/0327856 A1*   12/2009    Mouilleseaux ...... G11B 27/034
                                                          715/230
(Continued)

FOREIGN PATENT DOCUMENTS

EP    2 472 383    7/2012
EP    2 731 003    5/2014
(Continued)

OTHER PUBLICATIONS

European Search Report dated Jun. 4, 2018 issued in Application No. 14905757.2.
(Continued)

*Primary Examiner* — Patrick N Edouard
*Assistant Examiner* — Peijie Shen
(74) *Attorney, Agent, or Firm* — KED & Associates, LLP

(57) ABSTRACT

The present invention relates to a mobile terminal capable of receiving a memo while recording a video. Specifically, the present invention relates to a mobile terminal including a camera, a touch screen and a controller. When a video is recorded using the camera, the controller is configured to control the touch screen to output a preview screen of the camera. If a touch and drag input is received on the outputted preview screen, the controller is configured to temporarily stop outputting the preview screen and store a touch path of the touch and drag input as a handwriting memo which is included in the recorded video.

17 Claims, 21 Drawing Sheets

(51) Int. Cl.
*G06F 3/038* (2013.01)
*G11B 27/036* (2006.01)
*H04N 21/854* (2011.01)
*H04N 5/77* (2006.01)
*H04N 9/82* (2006.01)

(52) U.S. Cl.
CPC ........... *G11B 27/036* (2013.01); *H04N 5/772* (2013.01); *H04N 9/8205* (2013.01); *H04N 21/854* (2013.01)

(56) References Cited

U.S. PATENT DOCUMENTS

| | | | |
|---|---|---|---|
| 2012/0174009 A1 | 7/2012 | Kwon | |
| 2013/0198176 A1 | 8/2013 | Kim | |
| 2013/0263002 A1* | 10/2013 | Park | G06F 3/0484 715/719 |
| 2013/0283144 A1 | 10/2013 | Roh et al. | |
| 2013/0342486 A1 | 12/2013 | Xin et al. | |
| 2013/0342729 A1* | 12/2013 | Kim | H04N 5/772 348/231.3 |
| 2014/0164889 A1 | 6/2014 | Nielsen et al. | |
| 2014/0226953 A1* | 8/2014 | Hou | H04N 21/4325 386/230 |
| 2015/0121441 A1 | 4/2015 | Apte et al. | |
| 2016/0080654 A1* | 3/2016 | Chang | G06T 5/002 348/208.99 |

FOREIGN PATENT DOCUMENTS

| | | |
|---|---|---|
| EP | 2 775 419 | 9/2014 |
| KR | 10-2012-0075845 | 7/2012 |
| WO | WO 2014/033729 | 3/2014 |

OTHER PUBLICATIONS

Korean Office Action dated Jul. 31, 2018 issued in in Application No. 10-2017-7015790.
International Search Report and Written Opinion dated Jul. 15, 2015 issued in Application No. PCT/KR2014/010964 (Full English Text).
Korean Notice of Allowance (with English translation) dated Feb. 19, 2019 issued in KR Application No. 10-2017-7015790.

* cited by examiner

[Fig. 1a]
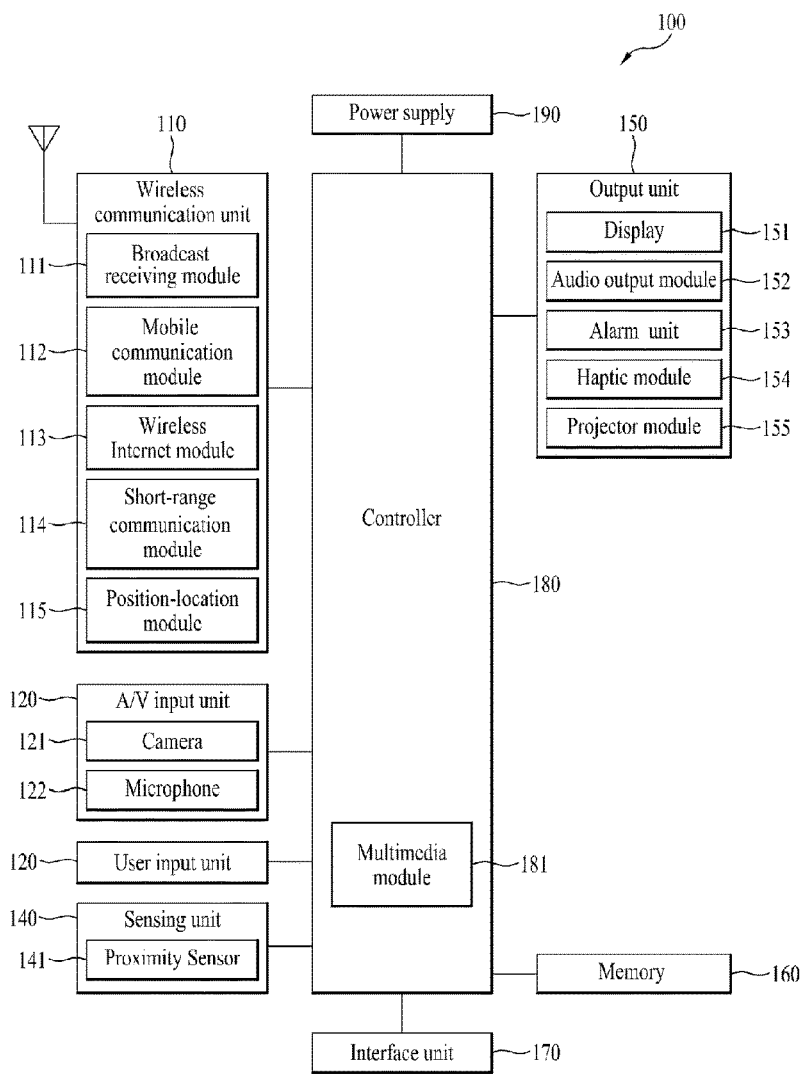
[Fig. 1b]
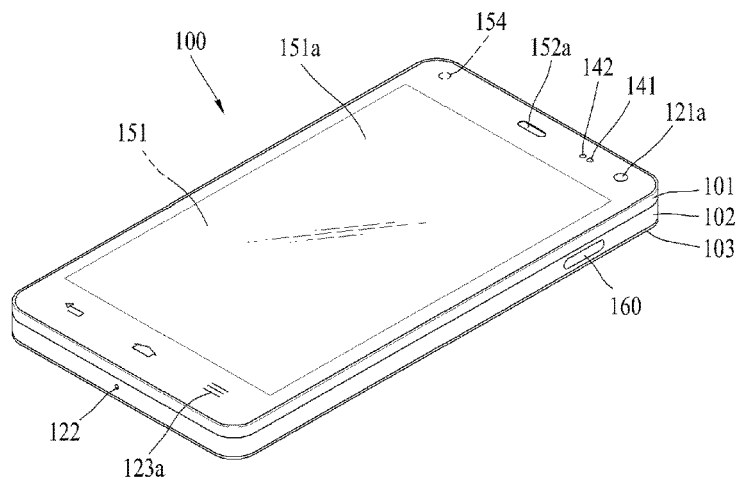

[Fig. 1c]
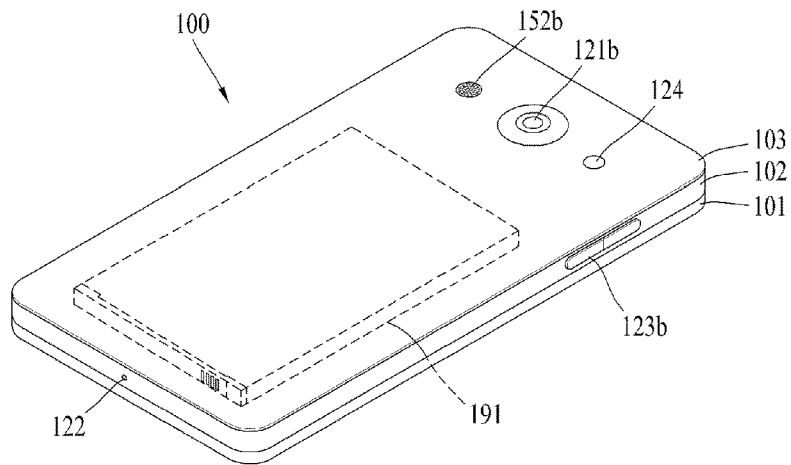
[Fig. 2]
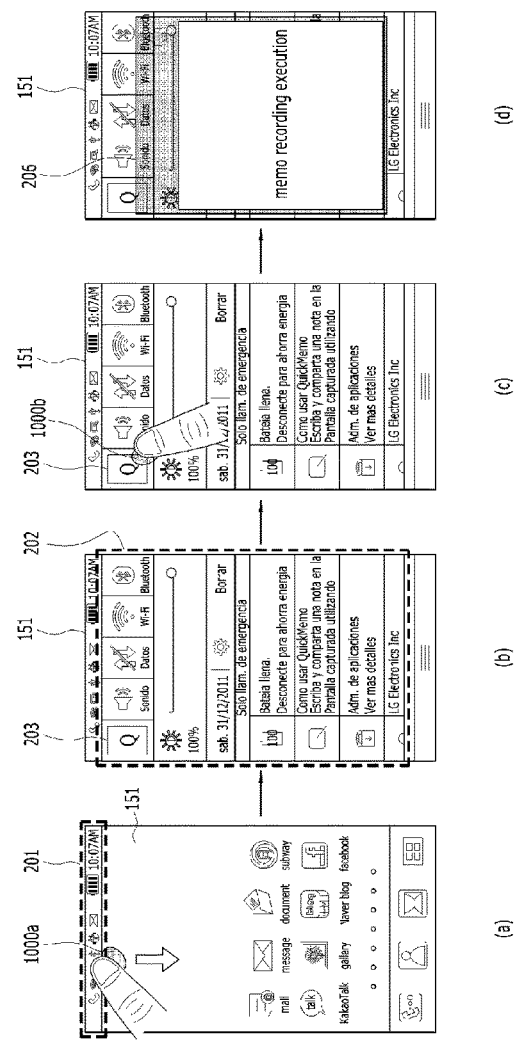

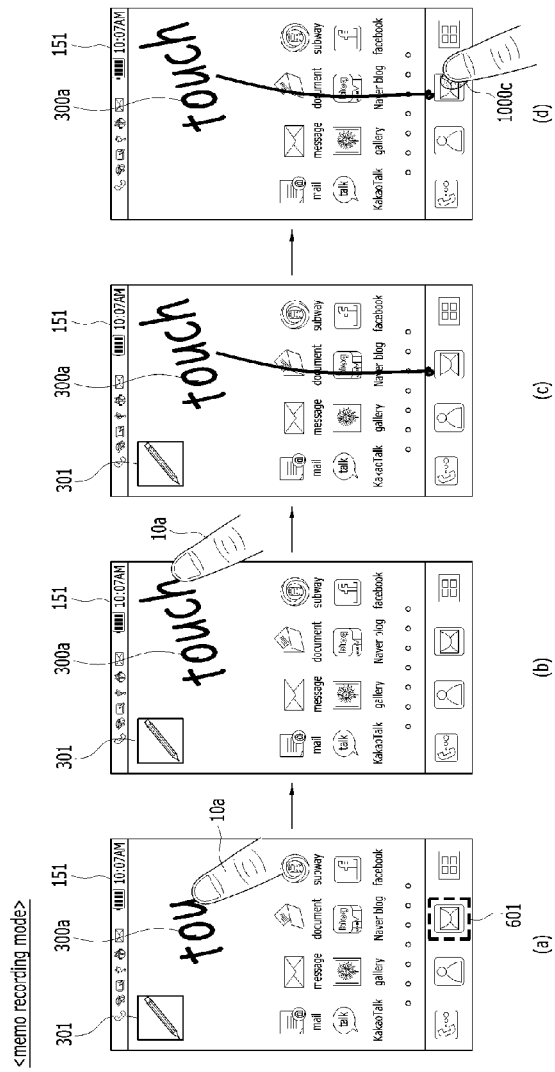
[Fig. 3]

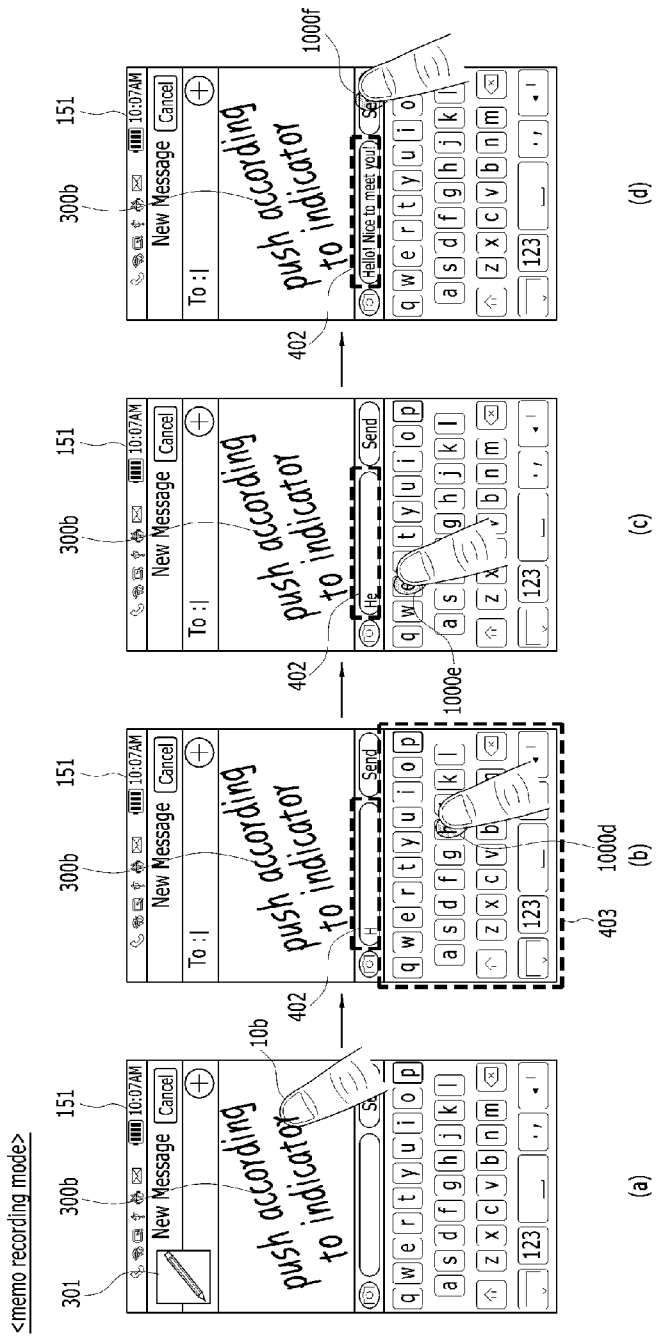
[Fig. 4]

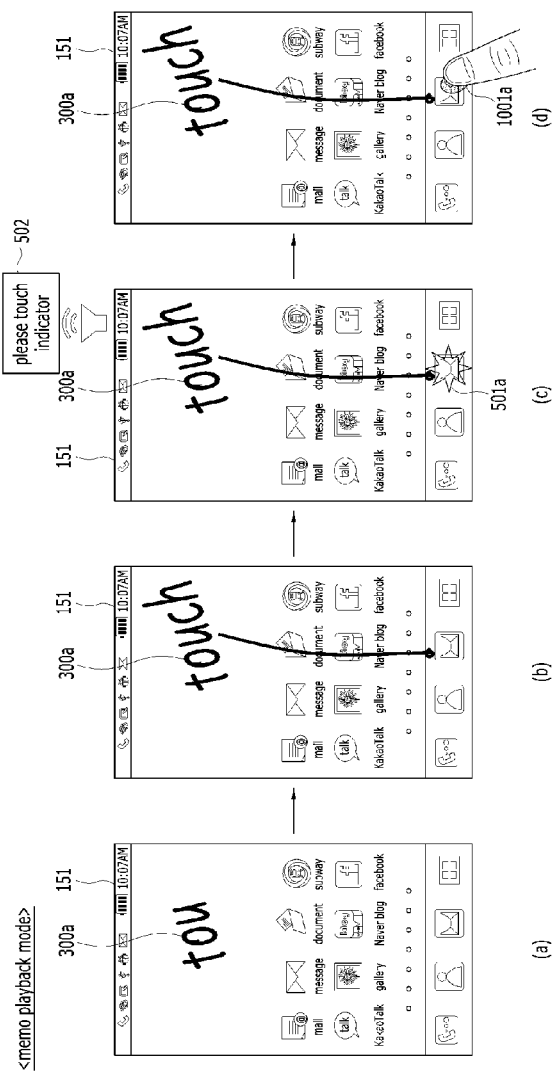
[Fig. 5]

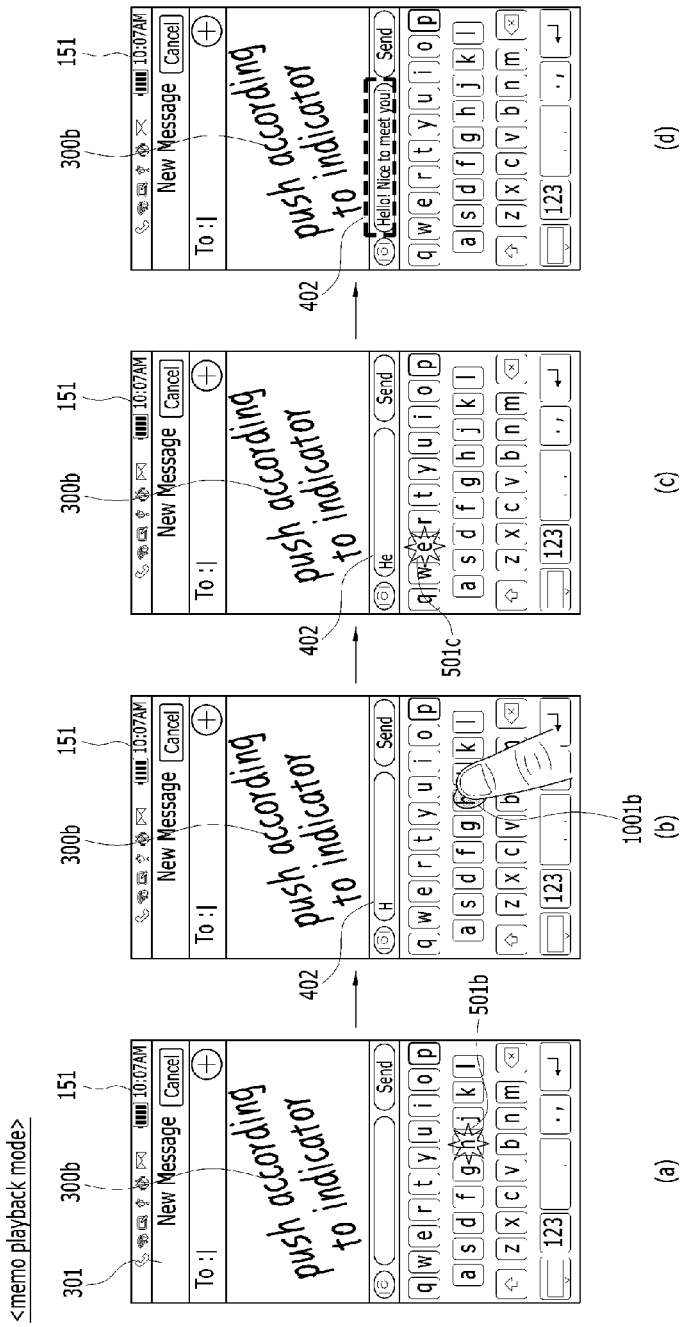
[Fig. 6]

[Fig. 7]
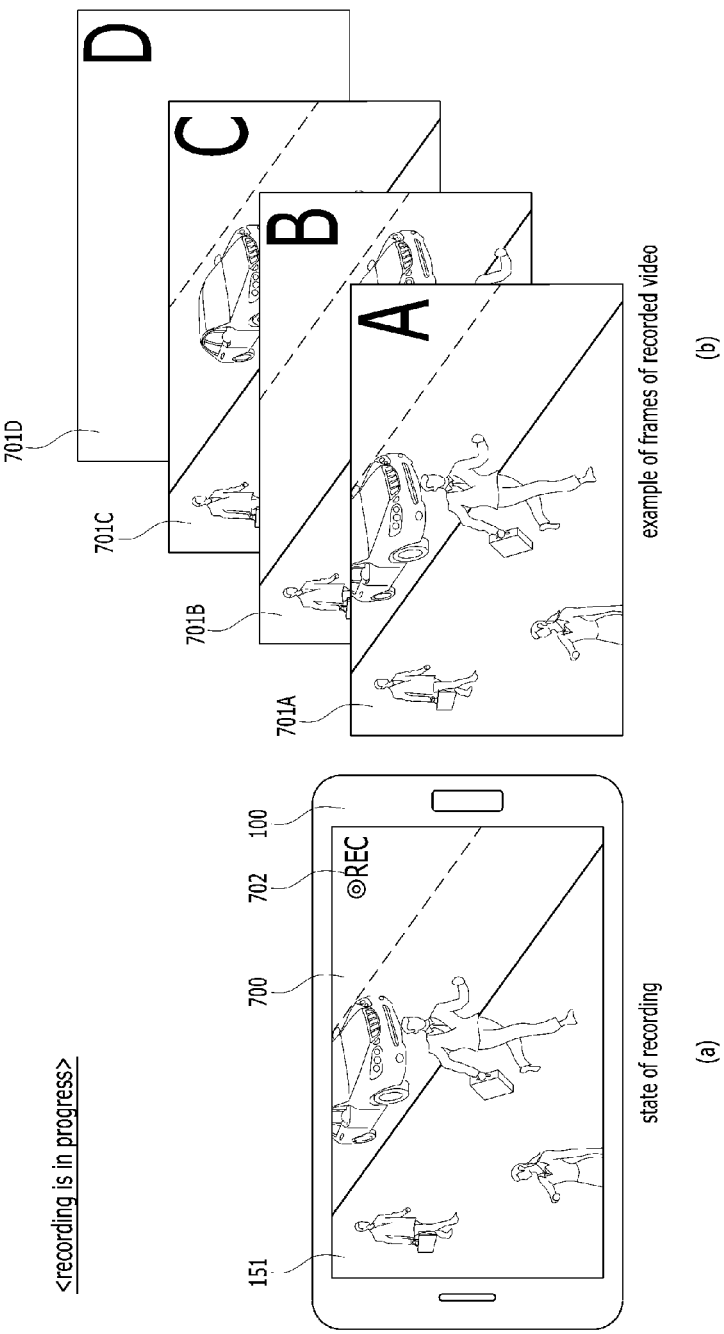

[Fig. 8]
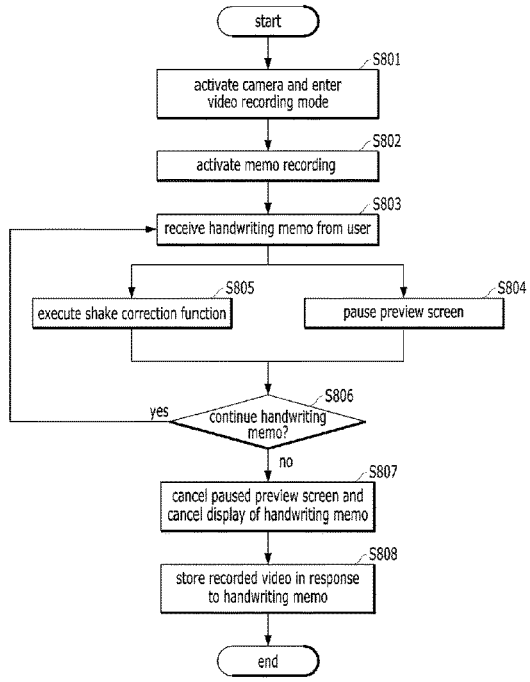
[Fig. 9]
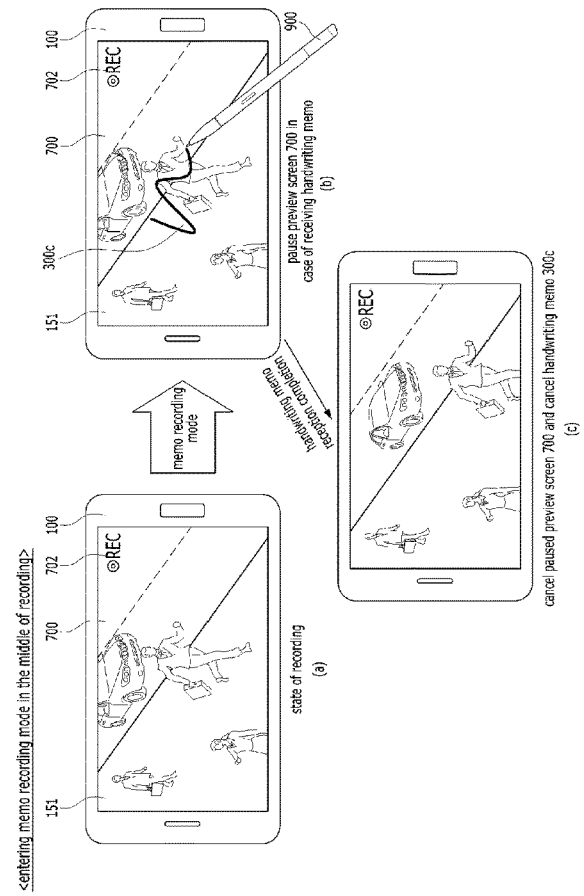

[Fig. 10]
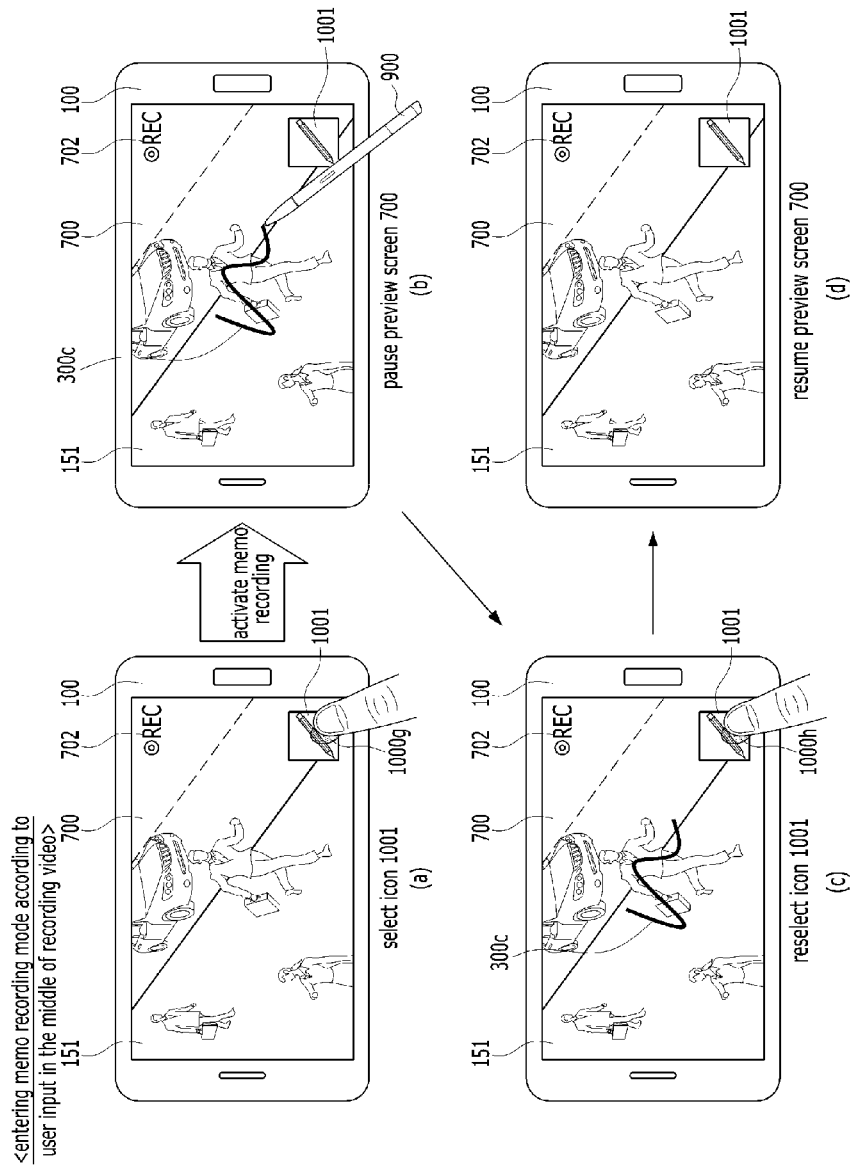

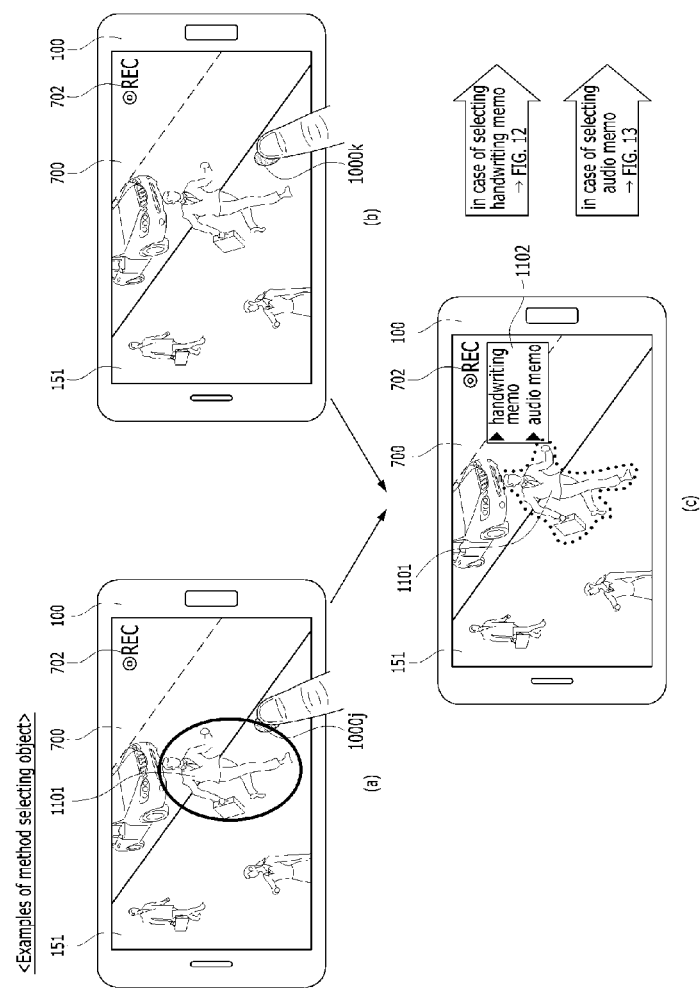
[Fig. 11]

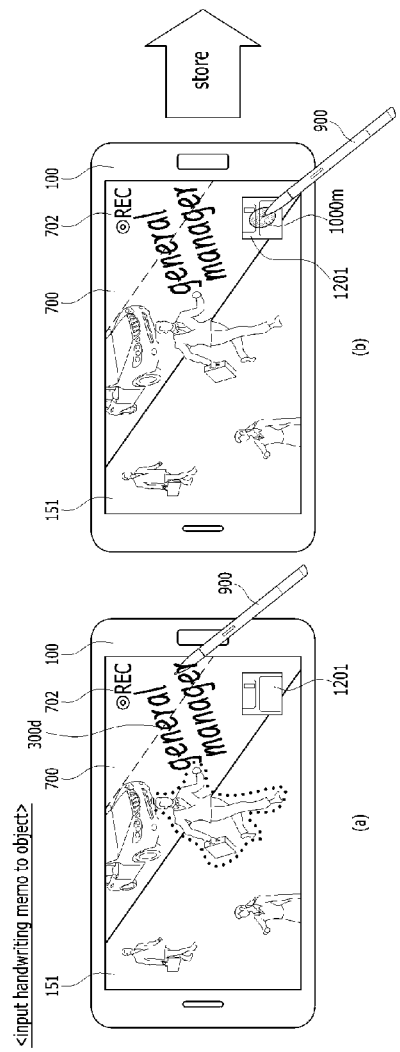
[Fig. 12]

[Fig. 13]
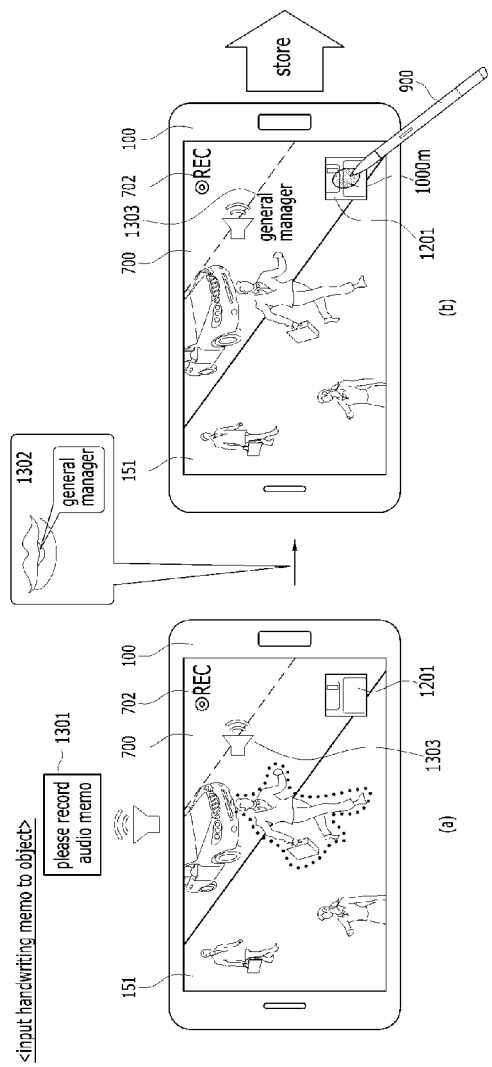

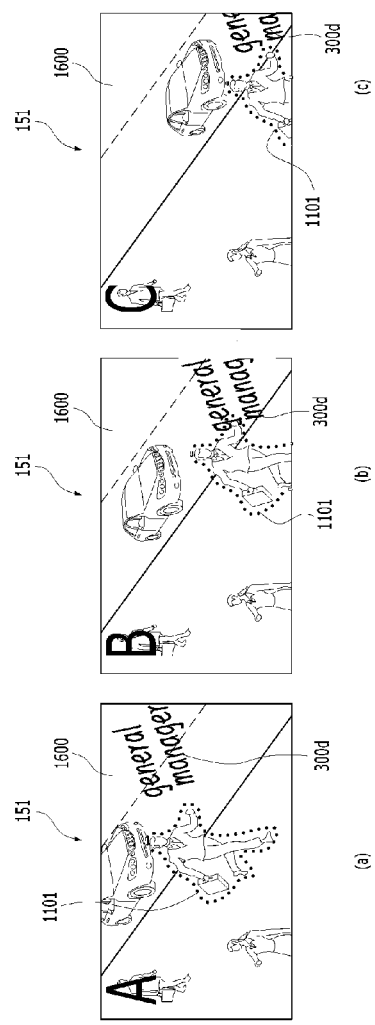
[Fig. 14a]

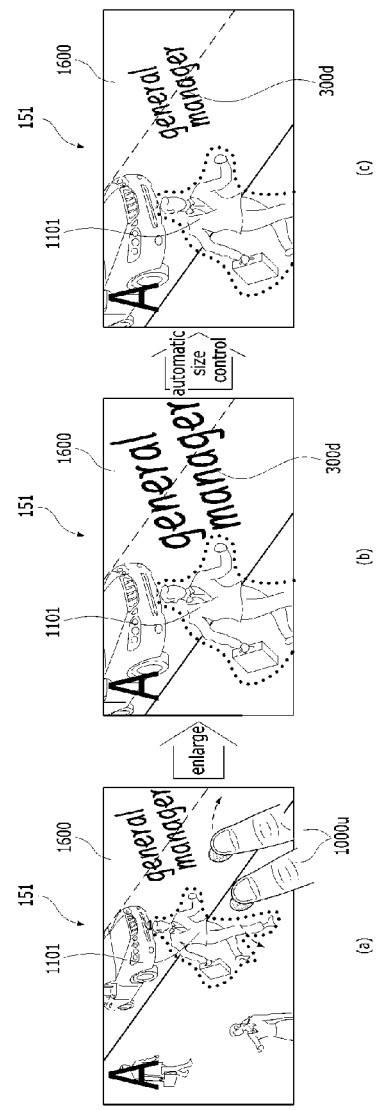
[Fig. 14b]

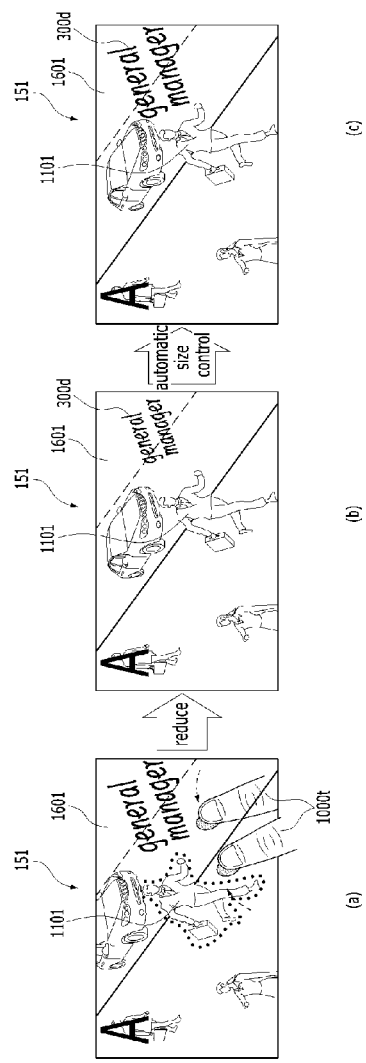
[Fig. 14c]

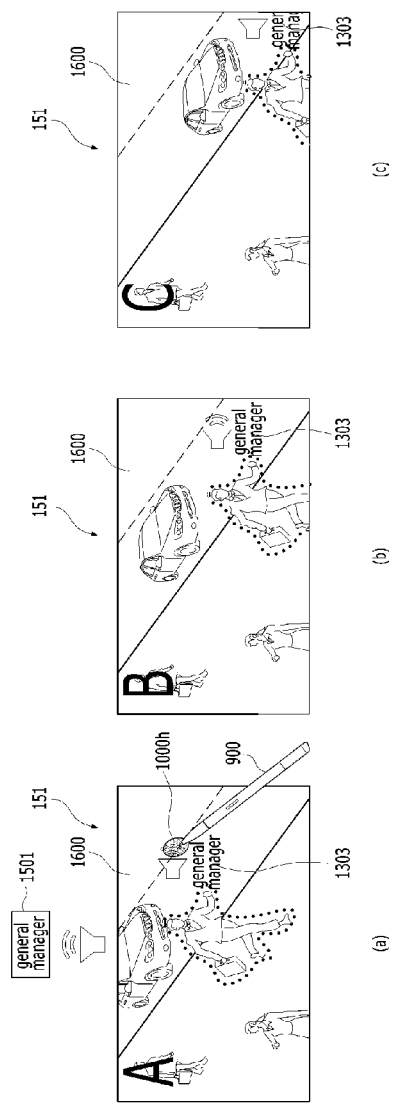
[Fig. 15]

[Fig. 16]
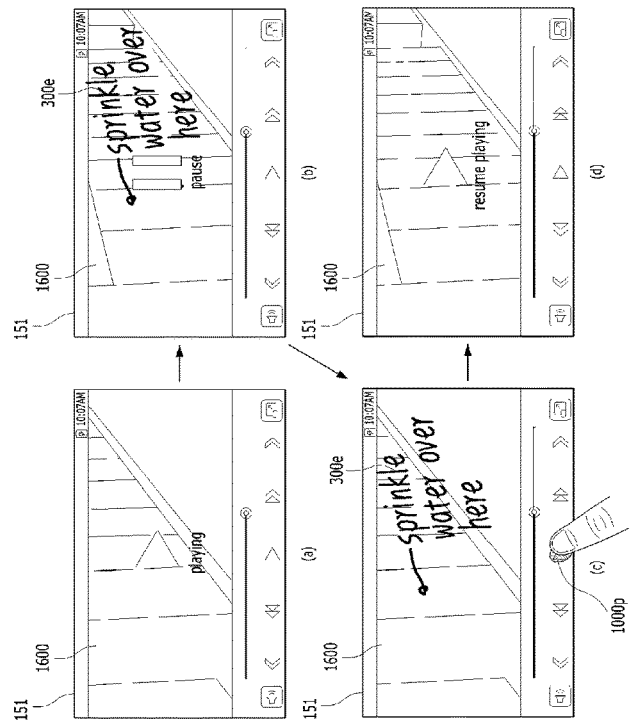
[Fig. 17]
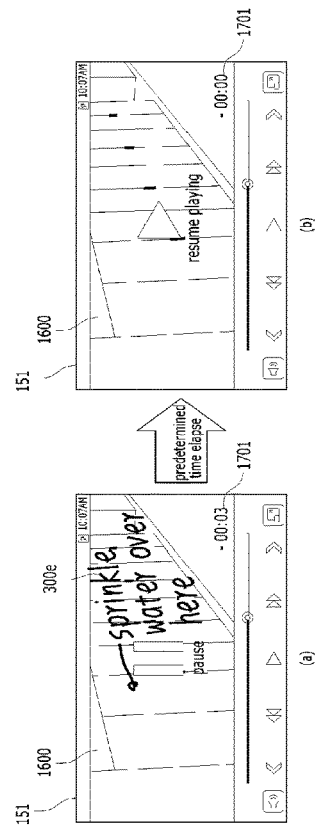

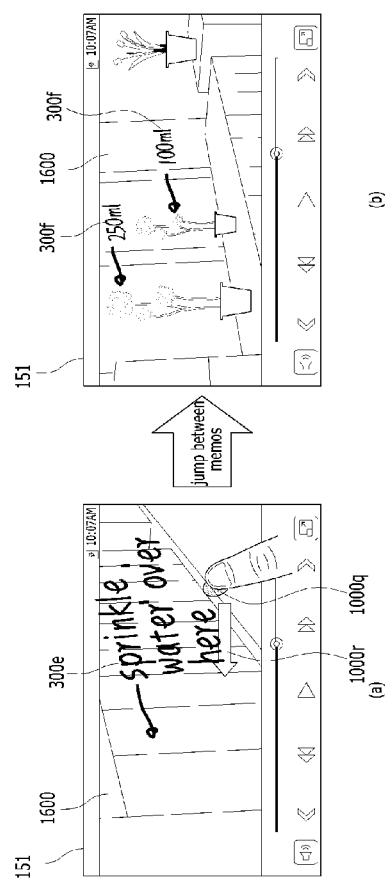
[Fig. 18]

[Fig. 19]
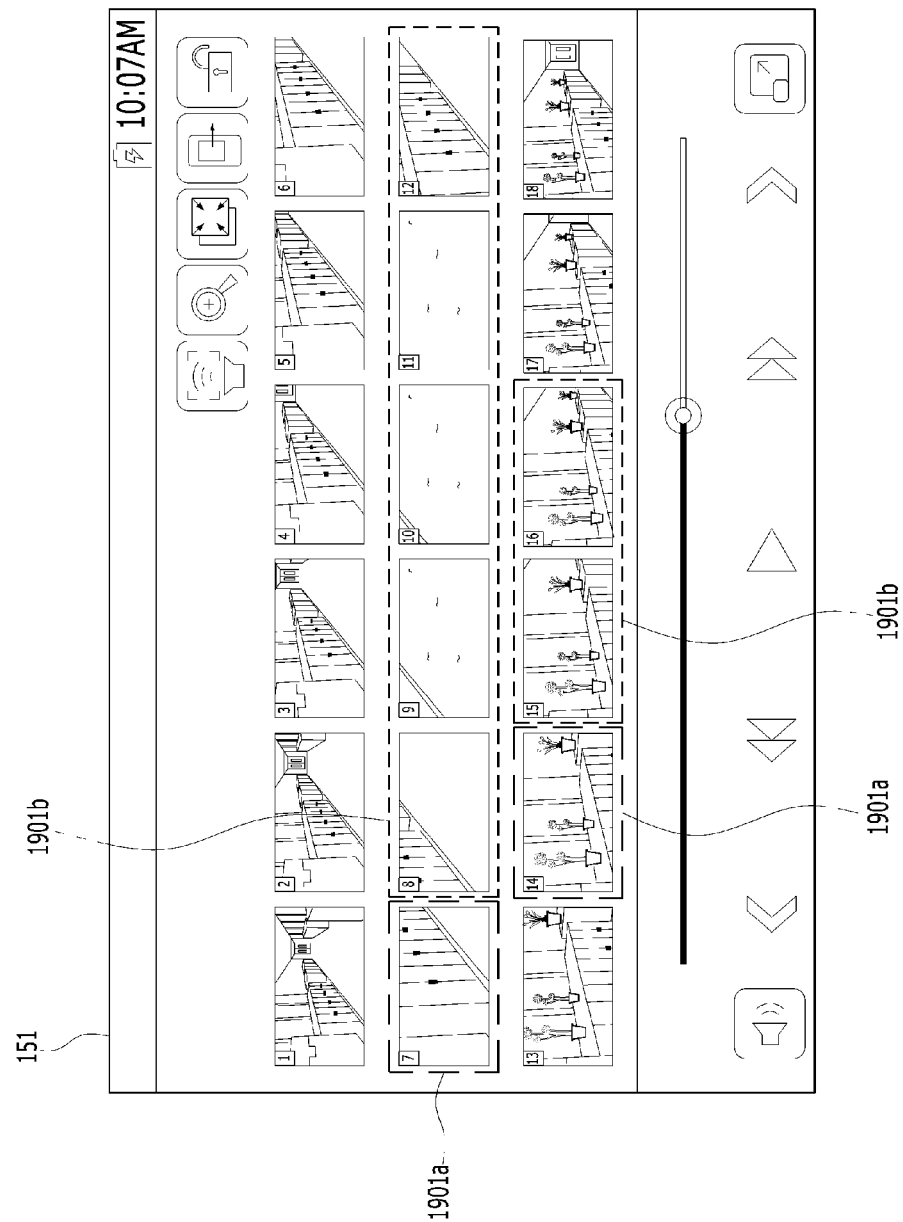

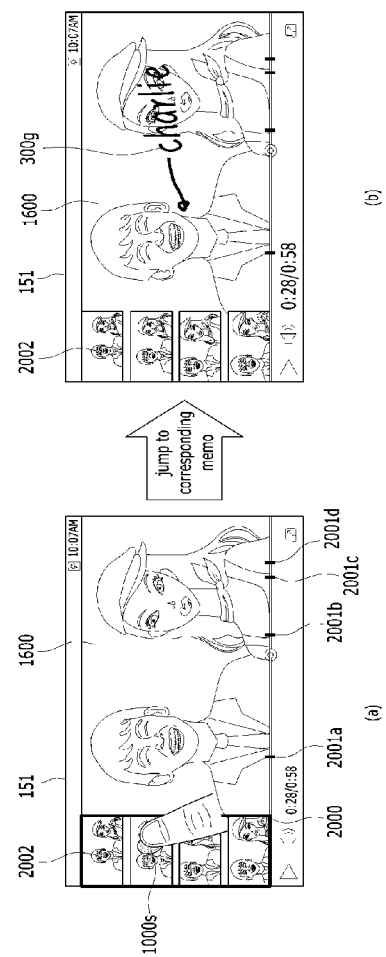

[Fig. 21]
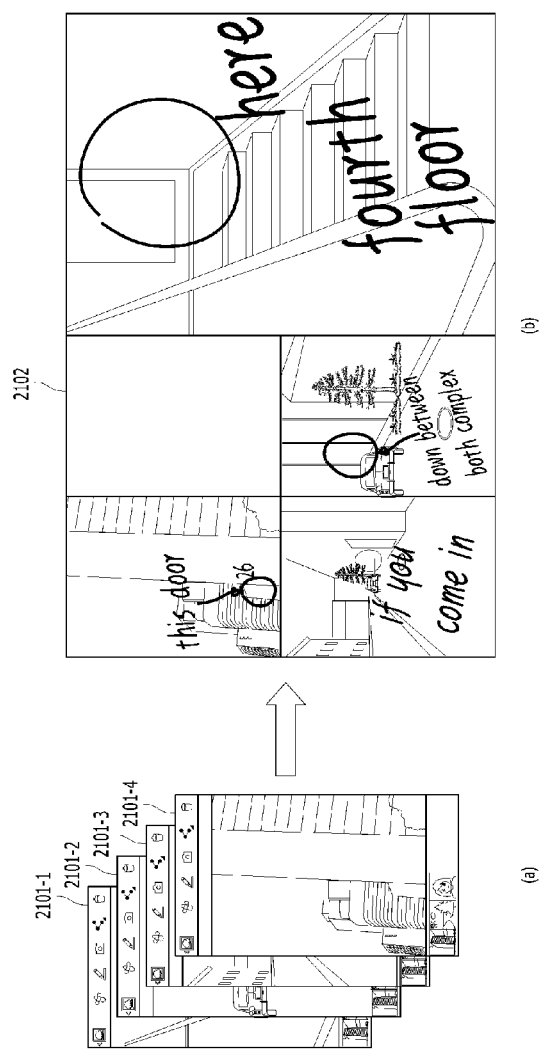

MOBILE TERMINAL AND METHOD FOR CONTROLLING THE SAME

CROSS-REFERENCE TO RELATED PATENT APPLICATIONS

This application is a U.S. National Stage Application under 35 U.S.C. § 371 of PCT Application No. PCT/KR2014/010964, filed Nov. 14, 2014, whose entire disclosure is hereby incorporated by reference.

TECHNICAL FIELD

The present invention relates to a mobile terminal enabling a user to more conveniently use the terminal and a method of controlling therefor.

BACKGROUND ART

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, as a smartphone market rapidly becomes huge, the number of users using a smartphone is also rapidly increasing and various functions of a smartphone enable a smartphone to move one step closer to a daily life of the smartphone user.

In particular, among the various functions capable of being performed by a smartphone, a function most relevant to a daily life of a user may correspond to a memo function. Hence, it is required to have a method capable of easily approaching the memo function and efficiently managing the memo function. In more particular, it is required to have a method capable of more conveniently and quickly inputting a memo in an environment in which a video is playing and efficiently managing in relation to the video.

DISCLOSURE OF INVENTION

Technical Problem

Accordingly, the present invention is directed to an apparatus and method thereof that substantially obviate one or more problems due to limitations and disadvantages of the related art. An object of the present invention is to provide a mobile terminal providing a more convenient memo environment to a user and a method of controlling therefor.

Another object of the present invention is to provide a mobile terminal providing a more convenient memo environment to a user while recording a video and a method of controlling therefor.

Solution to Problem

To achieve these and other advantages and in accordance with the purpose of the present invention, as embodied and broadly described, according to one embodiment, a mobile terminal includes a camera, a touch screen and if a video is recorded by the camera, a controller configured to control the touch screen to output a preview screen of the camera, the controller, if a touch and drag is received on the outputted preview screen, configured to pause the output of the preview screen and store a touch path of the touch and drag input as a handwriting memo which is included in the recorded video.

To further achieve these and other advantages and in accordance with the purpose of the present invention, according to a different embodiment, a method of controlling a mobile terminal includes the steps of recording a video by a camera, outputting a preview screen of the camera when the video is recorded and if a touch and drag input is received on the outputted preview screen, pausing the output of the preview screen and storing a touch path of the touch and drag input as a handwriting memo.

It is to be understood that both the foregoing general description and the following detailed description of the preferred embodiments of the present invention are exemplary and explanatory and are intended to provide further explanation of the invention as claimed.

Advantageous Effects of Invention

According to at least one or more embodiments of the present invention, it is able to simultaneously provide a convenient memo input interface while a video recording preview screen is outputted.

According to at least one or more embodiments of the present invention, since it is able to input a memo associated with a video recording preview screen, the memo associated with the video recording preview screen can be conveniently read when a recorded video is played.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1a is a block diagram illustrating a mobile terminal according to one embodiment of the present invention;

FIGS. 1b and 1c are front and rear perspective diagrams of a mobile terminal according to one embodiment of the present invention;

FIG. 2 is a diagram for an example of a method of entering a memo recording mode of guide contents according to one embodiment of the present invention;

FIG. 3 is a diagram for a state of a memo recording mode according to one embodiment of the present invention;

FIG. 4 is a diagram for explaining a memo recording mode using an example of an execution state of a message application according to one embodiment of the present invention;

FIGS. 5 and 6 are diagrams for a method of controlling a memo playback mode explained by an example of an execution state of a message application according to one embodiment of the present invention;

FIG. 7 is a diagram for an example of a preview screen in case of recording a video and an example of frames of the recorded video according to one embodiment of the present invention;

FIG. 8 is a flowchart for a control method storing a handwriting memo and a video in a manner of activating a memo recording while the video is recording according to one embodiment of the present invention;

FIG. 9 is a diagram for a state that a memo recording is activated while a video is recording according to one embodiment of the present invention;

FIG. 10 is a diagram for a control method activating a memo recording based on a user command in the middle of recording a video according to one embodiment of the present invention;

FIG. 11 is a diagram for a control method storing a handwriting memo in response to an object existing in a recorded video according to one embodiment of the present invention;

FIG. 12 is a diagram for a control method storing a handwriting memo in response to a specified object according to one embodiment of the present invention;

FIG. 13 is a diagram for a control method storing an audio memo in response to a specified object according to one embodiment of the present invention;

FIGS. 14*a* to 14*c* are diagrams for a control method playing a handwriting memo, which is stored in a manner of being associated with a specified object, according to one embodiment of the present invention;

FIG. 15 is a diagram for a control method playing an audio memo, which is stored in a manner of being associated with a specified object, according to one embodiment of the present invention;

FIG. 16 is a diagram for a control method pausing a video according to one embodiment of the present invention in case that a handwriting memo is displayed on the video;

FIG. 17 is a diagram for a control method resuming a video, which is paused by an output of a handwriting memo, as a prescribed time elapses according to one embodiment of the present invention;

FIG. 18 is a diagram for a control method capable of easily switching between handwriting memos using a flicking gesture according to one embodiment of the present invention;

FIG. 19 is a diagram for a control method distinctively displaying a frame in which a memo is included in a thumbnail list of frames included in a video according to one embodiment of the present invention;

FIG. 20 is a diagram for a control method outputting a thumbnail list corresponding to timing on which a memo is inputted on a video playback screen according to one embodiment of the present invention;

FIG. 21 is a diagram for a control method showing memos included in a video in a manner of putting together the memos according to one embodiment of the present invention.

BEST MODE FOR CARRYING OUT THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the description only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipment, smart phones, digital broadcast receivers, personal digital assistants, laptop computers, portable multimedia players (PMP), navigators and the like. However, it is apparent to those skilled in the art that a configuration according to an embodiment disclosed in this specification is applicable to such a fixed terminal as a digital TV, a desktop computer and the like as well as a mobile terminal.

FIG. 1*a* is a block diagram of a mobile terminal 100 in accordance with an embodiment of the present invention. FIG. 1*a* shows the mobile terminal 100 includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1*a* shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. In a non-limiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-information module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a realtime current location.

Referring to FIG. 1*a*, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 for a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button provided to front/rear/lateral side of the mobile terminal 100 and a touch sensor (constant pressure/electrostatic) and may further include a key pad, a dome switch, a jog wheel, a jog switch and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and the touch sensor configures a mutual layer structure (hereinafter called 'touch screen'), the display 151 can be used as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, the touch sensor can be configured to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Referring to FIG. 1b, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor 141 has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm 153 is output a signal for announcing the occurrence of a particular event associated with the mobile terminal 100. Typical events include a call received event, a message received event and a touch input received event. The alarm 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

A projector module 155 can also be included for projecting images stored in the memory 160, externally received etc. The projector module 155 can also be rotated so as to project images in different directions.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output for a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 can perform a pattern (or image) recognizing process for recognizing a writing input and a picture drawing input performed on the touchscreen as characters or images, respectively.

The power supply 190 provides power required by the various components for the mobile terminal 100. The power may be internal power, external power, or combinations thereof. A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Next, FIG. 1*b* is a front perspective diagram of a mobile terminal according to one embodiment of the present invention. The mobile terminal 100 shown in the drawing has a bar type terminal body, however, the mobile terminal 100 may be implemented in a variety of different configurations. Examples of such configurations include folder-type, slide-type, rotational-type, swing-type and combinations thereof. For clarity, the following description will primarily relate to a bar-type mobile terminal 100. However such teachings apply equally to other types of mobile terminals.

Referring to FIG. 1*b*, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Electronic components can be mounted on a surface of the rear case 102. The electronic part mounted on the surface of the rear case 102 may include such a detachable part as a battery, a USIM card, a memory card and the like. Thus, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIGS. 1*b* and 1*c*, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening configured to expose a camera 121' or an audio output unit 152' externally. The cases 101, 102 and 103 are formed by injection molding of synthetic resin or can be formed of metal substance such as stainless steel (STS), titanium (Ti) or the like for example.

A display 151, an audio output unit 152, a camera 121, user input units 130 (131, 132 and 133), a microphone 122, an interface 180 and the like can be provided to the case 101 or 102. The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131, 132 and 133. The manipulating units 131, 132 and 133 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the manipulating unit 133.

FIG. 1c is a perspective diagram of a backside of the terminal shown in FIG. 3. Referring to FIG. 3, a camera 121' can be additionally provided to a backside of the terminal body, and more particularly, to the rear case 102. The camera 121' has a photographing direction that is substantially opposite to that of the camera 121 shown in FIG. 1b and may have pixels differing from those of the camera 121.

Preferably, for instance, the camera 121 has low pixels enough to capture and transmit a picture of user's face for a video call, while the camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view their face reflected by the mirror 124.

An additional audio output unit 152' can be provided to the backside of the terminal body. The additional audio output unit 152' can implement a stereo function together with the former audio output unit 152 shown in FIG. 1b and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1a can be retractably provided to the terminal body.

FIG. 2 is a diagram for an example of a method of entering a memo recording mode of guide contents according to one embodiment of the present invention. For clarity, a case forming an exterior of a mobile terminal 100 is not depicted. Instead, FIG. 2 shows a state displayed by a touch screen 151 only.

A record icon 203 for entering a memo recording mode can be executed on a control center 202 screen shown in FIG. 2 (b).

The control center 202 corresponds to a configuration screen capable of operating various configurations without executing a configuration application. The control center 202 can be called via a touch drag input 100a (e.g., a touch drag input in a down direction dragged from an indicator area) inputted on the indicator area 201. In this case, the various configurations can include on/off of a Bluetooth function, on/off of a WiFi function, volume control, brightness control and the like.

As shown in FIG. 2 (a), the indicator area 201 is always displayed on a prescribed position of a display unit 151 except a case that an application using a whole screen is displayed and performs a function of displaying various operation states (current time, battery status, radio signal reception strength and the like) of a mobile terminal.

If an input 1000b selecting the record icon 203 is received, as shown in FIG. 2 (d), the controller 180 can immediately enter the memo recording mode.

In the following, the memo recording mode is explained in more detail with reference to FIG. 3.

FIG. 3 is a diagram for a state of a memo recording mode according to one embodiment of the present invention. The controller 180 can store information on a touch input event of a user inputted in the memo recording mode.

Guide contents according to the present invention can be stored by receiving an input of a handwriting memo from a recording user. Or, event information on a touch gesture can be stored by receiving an input of the touch gesture inputted on an application execution screen while a function corresponding to the touch gesture is executed. The handwriting memo may correspond to an input writing a letter and the like on the touch screen 151 using a finger or a stylus pen in a manner of using the touch screen like a paper.

Referring to FIG. 3 (a), the mobile terminal 100 can receive an input of a handwriting memo using a touch and a touch gesture touched on the touch screen 151. The controller 180 can output a handwriting icon 301 to indicate that a handwriting input is activated in a state that the handwriting input is activated.

According to the drawing, a user is inputting such a handwriting memo as "touch" (hereinafter called a first handwriting memo) 300a using a finger and the controller 180 can display the inputted handwriting memo 300a on the touch screen. The inputted handwriting memo 300a can also be displayed on the touch screen 151 in a memo playback mode.

After the handwriting memo is inputted, assume a situation that an event touching a prescribed application icon 601 is to be stored. If the prescribed application icon 601 is touched 1000c in a state that a handwriting input is deactivated (a state that the handwriting icon 301 is disappeared as shown in FIG. 3 (d)), the controller 180 can store an event of the touch 1000c while executing the corresponding application at the same time. In the example shown in the drawing, the prescribed application corresponds to a message transmission and reception application. A recording mode of a state in which the application is executed is explained with reference to FIG. 4 in the following.

FIG. 4 is a diagram for explaining a memo recording mode using an example of an execution state of a message application according to one embodiment of the present invention.

Referring to FIG. 4 (a) to (d), it shows a state of the message transmission and reception application which is executed according to the touch 1000c performed in the aforementioned FIG. 3 (d). The state corresponds to a state maintaining the memo recording mode entered in FIG. 3.

Referring to FIG. 4 (a), such a handwriting memo as "push according to an indicator" (hereinafter called a second handwriting memo) 300b is received in a state (a state that the handwriting icon 301 is displayed) that a handwriting is activated. In particular, a user recording a guide content intends to record a memo capable of guiding a method of using the message transmission and reception application used for transmitting and receiving a message to a user reading the guide content.

FIG. 4 (b) to (d) shows a state that the handwriting input is deactivated. Hence, the controller 180 executes a function in response to a touch (1000d to 10000 received from a user and may be then able to store an event for the touch. Referring to FIG. 4 (d), a virtual keypad 403 for writing a transmission message is outputted. If an input 1000d typing a message is received via the virtual keypad 403, as shown in FIG. 4 (d), the controller 180 can display a typed letter on a transmission message input window 402. If a touch input 1000f for transmitting the typed letter is received, the controller 180 can store event information on the touch input 1000f while transmitting corresponding message.

Embodiments of playing a memo are explained with reference to FIG. 5 and FIG. 6 in the following based on the handwriting memo and the touch event information stored in the embodiment mentioned earlier with reference to FIG. 3 and FIG. 4.

FIGS. 5 and 6 are diagrams for a method of controlling a memo playback mode explained by an example of an execution state of a message application according to one embodiment of the present invention.

Referring to FIG. 5 (a), playback of the guide content stored in FIG. 3 is explained. Referring to FIG. 5 (a) to (c), the controller 180 can output the aforementioned first handwriting memo 300a via the touch screen 151. In this case, the first handwriting memo 300a can be sequentially outputted according to an input order. After the first handwriting memo 300a is outputted, a guide indicator 501a is outputted in response to the touch event 1000c mentioned earlier in FIG. 3. As shown in FIG. 5 (c), the guide indicator 501a can be displayed on a position of the touch screen 151 on which the touch 1000c is performed. Hence, the guide indicator 501a may guide a user reading the guide content to input a command identical to the touch 1000c.

If a touch 1001a is received from a user according to the guide indicator 501a which is displayed on a prescribed application icon 601, the controller 180 executes a prescribed application and can output an execution state of the prescribed application. The execution state is explained in FIG. 6 in the following.

FIG. 6 (a) to (d) shows an execution state of a memo transmission and reception application executed in a memo playback mode.

Referring to FIG. 6 (a), the controller 180 can output a second handwriting memo 300b of a user which is inputted in a memo recording mode. And, the controller 180 can display a guide indicator 501b in response to a touch 1000d of the user which is inputted in the memo recording mode. If an input touching 1001b the guide indicator 501b, which is displayed on a letter "H" of a virtual keypad, is received, the controller 180 inputs a letter "H" to a transmission message input window 402 and may be able to output a next guide indicator 501c. Subsequently, if an input touching the guide indicator 501c is received, the controller can sequentially output a next guide indicator. If a user performs touch inputs according to continuously outputted guide indicators, as shown in FIG. 6 (d), the user can complete a message to be transmitted in the transmission message input window 402.

By doing so, a user reading the guide content may be able to know a method of using a text message transmission and reception application via an outputted handwriting memo and a guide indicator.

Meanwhile, a control method applicable to a memo input received in an execution state of a mobile terminal 100 is explained in the aforementioned embodiment. In the following description, a control method capable of inputting a memo to a preview screen used for recording a video using the mobile terminal 100 is explained. The inputted memo can be displayed when a recorded video is played. Moreover, according to one embodiment of the present invention, when a video is recorded, a timing of inputting a memo to the video can be synchronized with a timing of displaying the memo. By doing so, the memo can be displayed on a corresponding timing in case of playing the video. In particular, in case of recording a video, a handwriting memo inputted on a first timing can be displayed on a timing corresponding to the first timing when the video is played.

FIG. 7 is a diagram for an example of a preview screen in case of recording a video and an example of frames of the recorded video according to one embodiment of the present invention.

Referring to FIG. 7 (a), it shows a video recording state continuously storing images received via a camera of a mobile terminal 100. In the state, a preview screen 700 of the recorded video can be provided to a user. A recording indicator 702 indicating that a video is currently recording can be further outputted in the preview screen 700.

A video is stored in a manner of storing a plurality of image frames in time order. As an example of a plurality of the frames, FIG. 7 (b) shows a first frame 701A to a fourth frame 701D. Embodiments described in the following are explained with reference to the frames shown in FIG. 7 (b). FIG. 8 is a flowchart for a control method storing a handwriting memo and a video in a manner of activating a memo recording while the video is recording according to one embodiment of the present invention. FIG. 9 is a diagram for a state that a memo recording is activated while a video is recording according to one embodiment of the present invention. Following description is explained with reference to FIG. 8 and FIG. 9.

In the step S801, the controller 180 activates a camera 121 and can enter a video recording mode. Referring to FIG. 9 (a), as mentioned earlier in FIG. 7, a preview screen 700 of a video and a recording indicator 702 are outputted in the video recording mode. If a command activating a memo recording is received, as shown in FIG. 9 (b), the controller 180 can activate the memo recording [S802] while maintaining recording of a video or pausing the recording of the video. As shown in FIG. 9 (b), the activation of the memo recording indicates a state that the controller 180 is able to receive an input of a handwriting memo 300c from a user (via a finger, a stylus pen 900 or the like). As an example of the command that activates the memo recording, embodiment of the present invention shows two methods.

As a first method, if a handwriting memo received from a user is detected [S803], memo recording can be automatically activated without a separate input. Regarding this embodiment, it shall be described in detail with reference to FIG. 9. As a second method, if a prescribed icon is touched, memo recording can be activated. Regarding this embodiment, it shall be described with reference to FIG. 10.

In the step S803, the controller 180 receives a handwriting memo 300c from a user. The inputted handwriting memo can be stored in response to a recorded video [S804]. The handwriting memo 300c, which is stored in response to the video, can be outputted together when the video is played. Playing the video is described in detail later.

Meanwhile, one embodiment of the present invention proposes a control method capable of enhancing user convenience in case of inputting a handwriting memo to a video recording preview screen 700.

If a handwriting memo is received from a user in the middle of recording a video, a screen of recording the video may be shaken. Hence, according to one embodiment of the present invention, if a handwriting memo received from a user is detected, a preview screen of the video is paused [S804] and a shake correction function can be executed [S805].

Meanwhile, a control method automatically pausing a preview screen 700 in case of detecting a handwriting memo received from a user is explained in the aforementioned embodiment. Yet, if a pause command is received by a user before a memo is inputted, the user may pause the preview screen 700 and may be then able to receive an input of a handwriting memo. Regarding embodiment of receiving a pause command received by a user, it shall be described in detail with reference to FIG. 10 in the following.

According to one embodiment of the present invention, although the preview screen 700 is paused, recording of a video can be seamlessly maintained using a camera 121.

In the step S806, the controller 180 determines whether an input of a handwriting memo is continuously performed. If the input of the handwriting memo is continuously performed, the controller may return to the step S803. If the input of the handwriting memo is not continuously performed (e.g., if an additional handwriting memo is not inputted for a predetermined time), the controller may determine it as the memo input is completed. Hence, as shown in FIG. 9 (c), the controller proceeds to the step S807 and may be then able to cancel the pause of the preview screen 700. Moreover, as shown in FIG. 9 (c), the controller can cancel the display of the handwriting memo 300c which is used to be displayed on the display.

FIG. 10 is a diagram for a control method activating a memo recording based on a user command in the middle of recording a video according to one embodiment of the present invention. FIG. 10 (a) is a diagram for a state of recording a video via an activated camera 121. The state includes an output of a preview screen 700 for the camera 121 and an output of a recording indicator 702. In addition, one embodiment of the present invention related to FIG. 10 further includes a memo recording activation icon 1001. If an input touching 1000g the memo recording activation icon 1001 is received, the controller 180 can activate memo recording.

As shown in FIG. 10 (b), if the memo recording is activated, the controller 180 can pause the preview screen 700 and can receive a handwriting memo 300c from a user. If reception of the handwriting memo 300c received from a user is completed, the controller 180 stores the handwriting memo and may be then able to resume the preview screen 700.

Meanwhile, there exists a necessity of appropriately determining a timing on which reception of a handwriting memo 300c received from a user is completed. Hence, (1) if the handwriting memo 300c is not received from a user for more than a prescribed time or (2) if a completion command is received, the controller 180 according to one embodiment of the present invention can determine it as an input of the handwriting memo 300c is completed. Referring to an example shown in FIG. 10 (c), it shows an input touching 1000h the memo recording activation icon 1001 again as an example of the completion command of the aforementioned (2).

Meanwhile, one embodiment of the present invention proposes that a handwriting memo recognizes a prescribed object included in a recorded video and is stored in response to the object. For instance, according to one embodiment of the present invention, a user can input a handwriting memo to a specific person or a specific animal. Regarding this embodiment, it shall be described with reference to FIG. 11 to FIG. 15 in the following.

FIG. 11 is a diagram for a control method storing a handwriting memo in response to an object existing in a recorded video according to one embodiment of the present invention.

Referring to an example shown in FIG. 11, there exist two types of user command that specifies an object. As a first method, if a touch drag received on a preview screen 700 forms a closed curve, the controller 180 can specify an object 1101 belonging to the closed curve (refer to FIG. 11 (a)). As a second method, if an input touching an object and holding the touch for more than a prescribed time is received, the controller 180 can specify the object 1101.

If the object 1101 is specified, as shown in FIG. 11 (c), the controller 180 can output a memo type pop-up window 1102 to receive a selection of a memo type. One embodiment of the present invention proposes to input a handwriting memo or an audio memo in response to the specified object. If a handwriting memo is selected from the memo type pop-up window 1102, the controller 180 can store a handwriting memo received from a user in response to the specified object 1101. Regarding this embodiment, it shall be described with reference to FIG. 12. If an audio memo is selected from the memo type pop-up window 1102, the controller 180 can store an audio memo received from a user in response to the specified object 1101. Regarding this embodiment, it shall be described with reference to FIG. 13.

FIG. 12 is a diagram for a control method storing a handwriting memo in response to a specified object according to one embodiment of the present invention.

FIG. 12 (a) is a diagram for a state that a video is recorded via an activated camera 121. The state includes an output of a preview screen 700 for the camera 121 and an output of a recording indicator 702. As mentioned earlier in FIG. 11, a handwriting memo 300d is received in response to a specified object 1101. As shown in FIG. 12 (b), if a storing icon 1201 is selected, the controller 180 can store the handwriting memo 300d in response to the specified object 1101.

FIG. 13 is a diagram for a control method storing an audio memo in response to a specified object according to one embodiment of the present invention.

FIG. 13 (a) is a diagram for a state that a video is recorded via an activated camera 121. The state includes an output of a preview screen 700 for the camera 121 and an output of a recording indicator 702. As mentioned earlier in FIG. 11, a guiding comment 1301 guiding an input of an audio memo, which is stored in response to a specified object 1101, can be outputted via an audio output module 152 and an audio memo icon 1303 can be displayed in the vicinity of the specified object 1101, which is displayed on the preview screen 700. Subsequently, if an audio memo 1302 is received and a storing icon 1201 is selected, the controller 180 can store the received audio memo 1302 in response to the specified object 1101.

In the following, a control method outputting a memo, which is stored in response to a specified object, is explained with reference to FIG. 14*a*, 14*b*, 14*c* and FIG. 15.

FIGS. 14*a* to 14*c* are diagrams for a control method playing a handwriting memo, which is stored in a manner of being associated with a specified object, according to one embodiment of the present invention.

FIG. 14*a* (a) to (c) indicate frames sequentially included in a recorded video. In this case, assume that the frames are arranged in a recorded time order. If the recorded video is played by the aforementioned method, according to one embodiment of the present invention, a memo (a handwriting memo and/or an audio memo) inputted to a screen of the played video can be outputted as well.

Referring to FIG. 14*a* (a), a handwriting memo 300*d*, which is stored in response to an object 1101 specified at the time of recording, is outputted. If the specified object 1101 moves in the played video, one embodiment of the present invention proposes that a position of the handwriting memo 300*d* moves in response to the movement of the specified object.

As shown in FIG. 14*a* (b) and (c), the specified object 1101 moves to a diagonal bottom right direction and is getting out of a screen on which the video is playing. In this case, as shown in FIG. 14*a* (b) and (c), the controller 180 can move a position on which the outputted handwriting memo 300*d* is displayed in response to the movement of the specified object 1101. Regarding embodiment for an audio memo, it shall be described with reference to FIG. 15.

Meanwhile, in the embodiment related to FIG. 14*a*, if the handwriting memo 300*d* is outputted, playback of the video can be controlled to be paused. In this case, if an input touching the outputted handwriting memo 300*d* is received, the controller 180 can resume the paused playback of the video.

FIG. 14*b* and FIG. 14*c* show an example of still frames of a recorded video, by which the present invention may be non-limited. FIG. 14*b* and FIG. 14*c* can also be applied when the recorded video is playing.

If a pause command is received in the middle of playing a video, as shown in FIG. 14*b*, the controller 180 stops playing the video and can display a still frame 1601 displaying a frame. And, the controller 180 can output a memo (a handwriting memo) 300*d* inputted to the still frame 1601 together with the still frame.

If a command enlarging the still frame 1601 is received, as shown in FIG. 14*b*, the controller 180 can output the still frame 1601 in a manner of enlarging the still frame. According to one embodiment of the present invention, if the still frame 1601 is enlarged, it is able to control the memo 300*d*, which is displayed together with the still frame, to be displayed in a manner of being enlarged. As an example of the command enlarging the still frame 1601, the command may correspond to a touch gesture 1000*u* touching two points of the touch screen 151 and dragging the two points to directions opposite to each other.

Moreover, if a size of the enlarged memo 300*d* becomes greater than a prescribed size by the enlargement control, one embodiment of the present invention proposes that the size of the memo 300*d* is controlled to be automatically reduced (refer to FIG. 14*b* (c)). This is because, if the size of the memo 300*d* is too much enlarged, it is inconvenient for a user to read the memo 300*d*.

Similarly, if a pause command is received in the middle of playing a video, as shown in FIG. 14*c*, the controller 180 stops playing the video and can display a still frame 1601 displaying a frame. And, the controller 180 can output a memo (a handwriting memo) 300*d* inputted to the still frame 1601 together with the still frame.

If a command reducing the still frame 1601 is received, as shown in FIG. 14*c*, the controller 180 can output the still frame 1601 in a manner of reducing the still frame. According to one embodiment of the present invention, if the still frame 1601 is reduced, it is able to control the memo 300*d*, which is displayed together with the still frame, to be displayed in a manner of being reduced. As an example of the command reducing the still frame 1601, the command may correspond to a touch gesture 1000*t* touching two points of the touch screen 151 and dragging the two points to directions opposite to each other.

Moreover, if a size of the reduced memo 300*d* becomes less than a prescribed size by the reduce control, one embodiment of the present invention proposes that the size of the memo 300*d* is controlled to be automatically enlarged (refer to FIG. 14*c* (c)). This is because, if the size of the memo 300*d* is too much reduced, it is inconvenient for a user to read the memo 300*d*.

FIG. 15 is a diagram for a control method playing an audio memo, which is stored in a manner of being associated with a specified object, according to one embodiment of the present invention.

Similar to FIG. 14*a*, FIG. 15 (*a*) to (*c*) show frames sequentially included in a recorded video. In this case, assume that the frames are arranged in a recorded time order. In case of playing the video recorded by the aforementioned method, according to one embodiment of the present invention, an audio memo icon 1303 can be outputted together on a screen of the video.

Referring to FIG. 15 (*a*), the audio memo icon 1303 for an audio memo, which is stored in response to an object 1101 specified at the time of recording the video, is outputted. If an input selecting 1000*h* the outputted audio memo icon 1303 is received, the controller 180 can output the stored audio memo via an audio output module 152.

In addition, if the specified object moves in the played video, one embodiment of the present invention proposes that a position of the audio memo icon 1303 also moves in response to the movement of the specified object.

As shown in FIGS. 15 (*b*) and (*c*), the specified object 1101 moves to a diagonal bottom right direction in the played video and is getting out of a screen 1600 on which the video is playing. In this case, as shown in FIGS. 15 (*b*) and (*c*), the controller 180 can also move a position on which the outputted memo icon 1303 is displayed in response to the movement of the specified object 1101.

According to the aforementioned embodiment, when a video is playing, although a handwriting memo or an audio memo is displayed on the video, playback of the video is not stopped. In the following embodiment explained with reference to FIG. 16 to FIG. 18, a control method that pauses the playback of the video at the time of displaying the handwriting memo or the audio memo is explained.

FIG. 16 is a diagram for a control method pausing a video according to one embodiment of the present invention in case that a handwriting memo is displayed on the video.

Referring to FIG. 16 (a), a playback screen of a video in which a handwriting memo 300e is included is outputted via a touch screen 151 according to the aforementioned method. If the handwriting memo 300e is displayed in the middle of playing the video, the controller 180 can pause the playing video (refer to FIG. 16 (b)).

Subsequently, if a video resuming command 1000p of a user is received (refer to FIG. 16 (c)), as shown in FIG. 16 (d), the controller 180 resumes the playback of the video and can stop displaying the outputted handwriting memo 300e.

According to the embodiment mentioned earlier with reference to FIG. 16, if a handwriting memo is displayed, playback of a video is automatically stopped and the playback of the video resumes by a resuming command of a user. Yet, this is just an example. The playback of the video may resume when a prescribed time elapses. Regarding this embodiment, it shall be described with reference to FIG. 17 in the following.

FIG. 17 is a diagram for a control method resuming a video, which is paused by an output of a handwriting memo, as a prescribed time elapses according to one embodiment of the present invention.

Referring to FIG. 17 (a), as mentioned earlier in FIG. 16, it shows a state that playback of a video is stopped in the middle of playing the video as a handwriting memo 300d is displayed on a playback screen 1600 of the video. One embodiment of the present invention related to FIG. 17 proposes that the playback of the video, which is paused by the handwriting memo 300e, resumes when a prescribed time elapses.

In particular, if a prescribed time elapses after the playback of the video is stopped by the output of the handwriting memo 300e, as shown in FIG. 17 (b), the controller 180 can resume the playback of the stopped video.

Meanwhile, the controller 180 can further display a video resuming timer 1701 on a touch screen 151 to indicate video resuming timing. If counting of the displayed video resuming timer 1701 is completed, the controller 180 can resume the playback of the video.

Meanwhile, one embodiment of the present invention further proposes a control method capable of easily switching between the displayed handwriting memos 300e. Regarding this embodiment, it shall be described with reference to FIG. 18 in the following.

FIG. 18 is a diagram for a control method capable of easily switching between handwriting memos using a flicking gesture according to one embodiment of the present invention.

Referring to FIG. 18 (a), the controller 180 displays a first handwriting memo 300e on a playback screen 1600 of a video. As mentioned in the foregoing description, if the first handwriting memo 300e is outputted, the controller 180 can pause playback of the video. If a prescribed touch gesture (e.g., flicking input 1000q/1000r) is received from a user, as shown in FIG. 18 (b), the controller 180 can output a video playback screen 1600 in which a second handwriting memo 300f is included. In particular, this may correspond to a control method capable of easily jumping between frames to which a handwriting memo or an audio memo is inputted among frames included in the video.

Meanwhile, one embodiment of the present invention proposes that a thumbnail list of frames included in a video is outputted and thumbnail items related to timing on which a memo is inputted are distinctively displayed in the outputted thumbnail list to more easily manage the inputted memo. Regarding this embodiment, it shall be described with reference to FIG. 19 in the following.

FIG. 19 is a diagram for a control method distinctively displaying a frame in which a memo is included in a thumbnail list of frames included in a video according to one embodiment of the present invention.

If a command (e.g., an input touching a prescribed icon) outputting a thumbnail list is received from a user, as shown in FIG. 19, the controller 180 can output the thumbnail list including frames of a video. The thumbnail list may consist of frames including a prescribed time interval. Referring to an example shown in FIG. 19, each item included in the thumbnail list is numbered by one of numbers ranging from 1 to 18. In this case, assume that the numbering is performed according to a time order.

If memos are inputted on timings corresponding to a 7th frame and a 14th frame, respectively, in the middle of recording a video, the controller 180 can output a memo start indicator 1901a on the 7th frame and the 14th frame in the outputted thumbnail list. Subsequently, if a memo is inputted on timing corresponding to frames from a 8th frame to a 12th frame, the controller 180 may further output a memo input indicator 1901b including the frames from the 8th frame to the 12th frame. Similar to this, if a memo is inputted on timing corresponding to frames from a 15th frame to a 16th frame, the controller 180 may further output a memo input indicator 1901b including the frames from the 15th frame to the 16th frame.

A user may easily check a frame to which a memo is inputted by reading the outputted thumbnail list.

Meanwhile, one embodiment of the present invention proposes that the thumbnail list is to be read on a video playback screen. Regarding this embodiment, it shall be described with reference to FIG. 20 in the following.

FIG. 20 is a diagram for a control method outputting a thumbnail list corresponding to timing on which a memo is inputted on a video playback screen according to one embodiment of the present invention.

Referring to FIG. 20 (a), a playback screen 1600 of a video is outputted and a thumbnail list is outputted in a partial area of the playback screen 1600 of the video. The thumbnail list may correspond to a thumbnail list for a frame corresponding to timing on which a memo is inputted among total frames included in the video.

If an input 1000s selecting a frame from the thumbnail list is received, as shown in FIG. 20 (b), the controller 180 directly moves to the frame and may be able to immediately output a memo 300g corresponding to the frame.

Moreover, one embodiment of the present invention proposes that memo timing indicators 2001a to 2001d are to be displayed on points corresponding to timings on which memos are inputted on a playback progressive bar, which is related to playback of a video. Similarly, if one of the memo timing indicators 2001a to 2001d is selected, a video playback screen 1600 may move to a frame of a corresponding timing.

Meanwhile, one embodiment of the present invention further proposes a control method capable of showing memos included in a video in a manner of putting together the memos. Regarding this embodiment, it shall be described with reference to FIG. 21 in the following.

FIG. 21 is a diagram for a control method showing memos included in a video in a manner of putting together the memos according to one embodiment of the present invention.

Referring to FIG. 21 (a), it shows an example of frames to which a handwriting memo is inputted among frames included in a recorded video. The controller 180 can store the frames shown in FIG. 21 (a) in a manner of synthesizing the frames as one image data (refer to FIG. 21 (b)) in response to a prescribed command of a user.

It will be apparent to those skilled in the art that the present invention can be specified into other form(s) without departing from the spirit or scope of the inventions.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A mobile terminal, comprising:
a camera;
a touch screen; and
a controller configured to:
when a video is recorded by the camera, manage the touch screen to output a preview screen of the camera,
when a touch and drag is received on the outputted preview screen, pause the output of the preview screen and store a touch path of the touch and drag input as a handwriting memo which is associated with the recorded video,
when a command specifying a prescribed object contained in the preview screen is received from a user, associate the handwriting memo with the prescribed object, wherein the command specifying the prescribed object corresponds to at least one of a touch and drag input forming a closed curve containing the prescribed object contained in the preview screen, or applying an input to a region of the preview screen containing the prescribed object and holding the input to the region of the preview screen containing the prescribed object for a prescribed time, and
control the touch screen to output a playback screen of the recorded video,
wherein when the prescribed object is displayed on the playback screen, the touch screen outputs the stored handwriting memo in a vicinity of the displayed prescribed object such that:
when the prescribed object is displayed in a first region of the playback screen, the handwriting memo is outputted in the first region of the playback screen, and
in response to the displayed prescribed object moving from the first region of the playback screen to a second region of the playback screen, the outputted handwriting memo moves from the first region of the playback screen to the second region of the playback screen with the prescribed object.

2. The mobile terminal of claim 1, wherein if the touch and drag input is received on the outputted preview screen, the controller is configured to activate a shake correction function of the camera.

3. The mobile terminal of claim 1, wherein the prescribed time is a first prescribed time, and if the touch and drag input is not received for more than a second prescribed time, the controller is configured to resume the output of the preview screen.

4. The mobile terminal of claim 1, further comprising a microphone,
wherein the controller is configured to store an audio memo received via the microphone as an audio memo associated with the video.

5. The mobile terminal of claim 1, wherein the controller is configured to control the touch screen to output the playback screen of the recorded video when a playback command is received.

6. The mobile terminal of claim 1, wherein when the stored handwriting memo is outputted in the playback screen, the controller is configured to control playback of the video to be paused.

7. The mobile terminal of claim 6, wherein if an input touching the outputted handwriting memo is received, the controller is configured to resume the playback of the video.

8. The mobile terminal of claim 1, wherein the controller is configured to output the stored handwriting memo based on a timing corresponding to a timing when the handwriting memo is inputted in the preview screen.

9. A method of controlling a mobile terminal, comprising the steps of:
recording a video by a camera;
outputting a preview screen when the video is recorded;
when a touch and drag input is received on the outputted preview screen, pausing the output of the preview screen and storing a touch path of the touch and drag input as a handwriting memo;
when a command specifying a prescribed object contained in the preview screen is received from a user, associating the handwriting memo with the prescribed object, wherein the command specifying the prescribed object corresponds to at least one of a touch and drag input forming a closed curve containing the prescribed object contained in the preview screen, or applying an input to a region of the preview screen containing the prescribed object and holding the input to the region of the preview screen containing the prescribed object for a prescribed time; and
outputting a playback screen of the recorded video,
wherein when the prescribed object is displayed on the playback screen, the touch screen outputs the stored handwriting memo in a vicinity of the displayed prescribed object such that:
when the prescribed object is displayed in a first region of the playback screen, the handwriting memo is outputted in the first region of the playback screen, and
in response to the displayed prescribed object moving from the first region of the playback screen to a second region of the playback screen, the outputted handwriting memo moves from the first region of the playback screen to the second region of the playback screen with the prescribed object.

10. The method of claim 9, if the touch and drag input is received on the outputted preview screen, the method further comprises activating a shake correction function of the camera.

11. The method of claim 9, wherein the prescribed time is a first prescribed time, and if the touch and drag input is not received for more than a second prescribed time, the method further comprises resuming the output of the preview screen.

12. The method of claim 9, further comprising storing an audio memo received via a microphone as an audio memo associated with the video.

13. The method of claim 9, wherein the playback screen of the recorded video is outputted when a playback command is received.

14. The method of claim 9, wherein when the stored handwriting memo is outputted, the playback screen pauses a playback of the video.

15. The method of claim 14, wherein if an input touching the outputted handwriting memo is received, the playback screen outputting step resumes the playback of the video.

16. The method of claim 9, wherein the method further comprises:
    outputting the stored handwriting memo in the playback screen based on a timing corresponding to a timing when the handwriting memo is inputted in the preview screen.

17. The mobile device of claim 1, wherein the controller is further configured to:
    display the handwriting memo with the paused output of the preview screen while the touch and drag is being received, and
    resume the output of the preview screen and cease displaying the handwriting memo when the touch and drag is no longer being received.

* * * * *